United States Patent [19]

Boateng et al.

[11] Patent Number: 4,525,332
[45] Date of Patent: Jun. 25, 1985

[54] RECOVERY OF GERMANIUM FROM AQUEOUS SOLUTIONS

[75] Inventors: Daniel A. D. Boateng, Montrose; Donald L. Ball, Castlegar; Godefridus M. Swinkels, Rossland, all of Canada

[73] Assignee: Cominco Ltd., Vancouver, Canada

[21] Appl. No.: 591,525

[22] Filed: Mar. 20, 1984

[30] Foreign Application Priority Data

Feb. 2, 1984 [CA] Canada .................................. 446656

[51] Int. Cl.$^3$ ............................................. C01G 17/00
[52] U.S. Cl. ........................................ 423/89; 210/681
[58] Field of Search ...................... 423/89; 521/28, 29, 521/30, 31, 34; 210/681

[56] References Cited

U.S. PATENT DOCUMENTS

| | | | |
|---|---|---|---|
| 2,675,359 | 4/1954 | Schneider | 260/2.1 |
| 2,813,838 | 11/1957 | Lyman et al. | 260/2.1 |
| 3,883,634 | 5/1975 | DeSchepper et al. | 423/89 |
| 4,184,019 | 1/1980 | Meteyer | 521/34 |
| 4,389,379 | 6/1983 | Bauer et al. | 423/89 |
| 4,432,951 | 2/1984 | DeSchepper et al. | 423/89 |
| 4,432,952 | 2/1984 | DeSchepper et al. | 423/89 |

OTHER PUBLICATIONS

Chemical Abstracts, vol. 97, 1982, Abstract 97:131097n, Nikol'skaya et al.
Nikol'skaya et al., Tsvetn. Met., 1982, (4), 61–63, in Russian.
Chemical Abstracts, vol. 87, 1977, Abstract 87:104906n, Nikol'skaya et al.
Chemical Abstracts, vol. 83, 1975, Abstract 102671e, Ivanova, Z. I. et al.
Chemical Abstracts, vol. 83, 1975, Abstract 16164f, Egorov et al.
Chemical Abstracts, vol. 80, 1974, Abstracts 5957d, 72970r, 85913z, Sobinyakova, N. M. et al.
Chemical Abstracts, vol. 81, 1974, Abstract 173462c, Slobtsov, L. E. et al.
L. E. Slobtsov et al., Removing Ge and Sb from Zn solutions by continuous countercurrent sorption, Tsvetnye Metally 15, No. 7, Jul. 1974.
Chemical Abstracts, vol. 79, 1973, Abstract 139556k, Sobinyakova, N. M. et al.
Chemical Abstracts, vol. 78, 1973, Abstracts 19185w, 76226j, Sobinyakova, N. M. et al.
Chemical Abstracts, vol. 76, 1972, Abstract 116317g, Matveeva, Z. I. et al.
Matveeva, Z. I. et al., Using Anionite AN-31 in Germanium Extraction, Tsvetny Metally, vol. 12, No. 12, 1971, 53–55.

*Primary Examiner*—John Doll
*Assistant Examiner*—Robert L. Stoll
*Attorney, Agent, or Firm*—Wenderoth, Lind & Ponack

[57] ABSTRACT

Germanium is recovered from aqueous solutions containing germanium, zinc, and antimony by sorption with an ion exchange resin which has as its matrix a backbone polymer to which are attached amine active groups chosen from secondary and tertiary amines and quaternary ammonium groups. The resin exhibits a high selectivity ratio of germanium relative to antimony. The method is particularly useful for the recovery of germanium from materials or electrolytes encountered in the recovery of zinc from ores and complex concentrates.

25 Claims, No Drawings

RECOVERY OF GERMANIUM FROM AQUEOUS SOLUTIONS

This invention is directed to a method for the recovery of germanium and, more particularly, is directed to a method for the selective recovery of germanium from aqueous solutions by ion-exchange.

Germanium, which has applications in the fields of polymer chemistry, fiber optics, infrared optics, electronics and the detection of ionized particles, is often recovered from intermediate products obtained in the processing of ores and metal concentrates. Such intermediate products can be in the form of germanium-containing solutions or solids, which are solubilized to give germanium-containing solutions. The germanium-containing solutions usually contain one or more of a large number of other metals.

One of such germanium-containing solutions is obtained from the leaching of zinc-bearing material with, for example, sulphuric acid to provide solutions suitable for the electrowinning of zinc. The solutions so produced contain, typically, zinc (80–150 g/L), germanium (0.001–1 g/L) and varying levels of sulphuric acid, together with other solutes from the zinc-bearing material such as cadmium, antimony, arsenic, copper, indium, iron, cobalt, nickel, manganese, calcium, magnesium, aluminum, gallium, thallium, tin, lead, selenium, tellurium, chlorine and fluorine, as well as other elements. In conventional practice, the leach solution is subjected to a series of purification steps to remove these solutes which, from the zinc electrolysis viewpoint are regarded as impurities. This includes germanium, which if present would either interfere with zinc electrowinning or decrease the purity and quality of the cathode zinc. In carrying out the present invention, it is desirable to selectively remove the germanium from the leach solution prior to the conventional purification steps. As is well known, many of these solute impurities are recovered as valuable by-products from the zinc process.

Although the invention will be described with specific reference to sulphuric acid leach solutions obtained from the leaching of zinc-bearing material, it is understood that the method of the invention is also suitable for the recovery of germanium from other germanium-containing solutions.

Several processes have been proposed for the recovery of germanium from both zinc electrolytes and other solutions. Processes based on precipitation with tannin and distillation of germanium tetrachloride are complicated. Liquid-liquid extraction and ion exchange/absorption techniques have been very broadly studied. However, for the most part, the low capacities obtained for most resins and extractants and the difficulty of integrating such processes with existing metal production processes have limited their application. For example, several known liquid-liquid extraction routes require significant acid levels in the aqueous solution to be efficient. Moreover, for many extractants it would be necessary to remove entrained and dissolved organic species in the electrolyte after treatment, because of their deleterious effects on any subsequent electrolysis. Further, the reported ion exchange procedures using basic resins appear to have the disadvantage that whilst adequate germanium recovery levels can be obtained, the resins are not particularly selective, in that large amounts of other metals, particularly antimony, are also absorbed by the resin thus complicating the germanium recovery.

This invention seeks to provide an ion-exchange process for selective germanium removal from aqueous solutions containing at least one other metal from among the group consisting of zinc, cadmium, copper, indium, antimony, arsenic and iron(II).

Additionally, this invention seeks to provide a process for the selective sorption of germanium from aqueous solutions containing both zinc and antimony.

Further, this invention seeks to provide an ion exchange process whereby substantially all of the germanium values present in an aqueous solution may be recovered. This invention is particularly applicable to aqueous leach solutions of the type obtained prior to the purification and the subsequent electrowinning of the zinc.

According to this invention, a process for the recovery of germanium from aqueous solutions containing germanium, zinc and antimony, is provided comprising: (i) germanium sorption from said aqueous solution by contacting the solution with an ion exchange resin which has as its matrix a backbone polymer, to which are attached amine active groups chosen from secondary and tertiary and quaternary ammonium groups, which resin also exhibits a selectivity ratio of germanium relative to antimony of at least 50:1; and (ii) elution of the sorbed germanium from the ion exchange resin by contacting the resin with an aqueous medium to give an aqueous solution containing the major part of the germanium in solution and resin containing a minor part of the sorbed germanium.

In the ion exchange resins used in this invention the amine active groups are secondary and tertiary amines (as in the so-called weakly basic exchangers) or quaternary ammonium groups (as in the so-called strong base exchangers) or a mixture thereof.

It is thus apparent that this invention relies on the discovery that certain ion exchange resins which have amine active groups in addition to sorbing germanium, which is to be expected, quite surprisingly do so selectively, particularly in the presence of antimony. This selectivity is surprising since other workers who have studied sorption of germanium using other ion exchange resins containing basic amine groups have reported only marginal selectivity, in that the germanium to antimony ratio has been below 2:1.

Three particularly useful resins have now been found which exhibit this selectivity to a marked degree. These are all in the Amberlite (trade mark) series of resins marketed in the United States of America and elsewhere by Rohm and Haas Company. These resins are identified as follows:

(i) IRA-46. This is described in U.S. Pat. No. 4,184,019. Claim 1 of this patent reads as follows: A weakly basic ion exchange resin comprising a polymer containing secondary hydroxyl groups, said polymer being a condensation product of an epihalohydrin and a polyamine, which polymer contains tertiary amine groups resulting from the reaction of said condensation product with formaldehyde and thereafter with formic acid, said polyamine having the general formula:

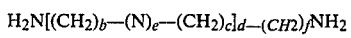

$$H_2N[(CH_2)_b-(N)_e-(CH_2)_c]_d-(CH_2)_f NH_2$$

wherein b is a number from 0 to 16, c is a number from 0 to 16, the sum of b plus c being 0 to 16, d is from 0 to 5, the sum of b plus c plus d being from 0 to 14, f is from 2 to 3, e is from 0 to 1, and when b is 0, e is 0 said polyamine having a molecular weight of from about 60 to about 298.

In this resin, the epihalohydrin used is epichlorohydrin, as specified in claim 5, and the polyamine is triethylenetetramine, as specified in claim 3.

(ii) IRA-68. This is described in U.S. Pat. No. 2,675,359. Claim 7 of this patent reads as follows: An insoluble, anion-exchange resin which is the product obtained by reacting at a temperature from 140° C. to 250° C. (a) dimethylaminopropylamine and (b) a cross-linked copolymer of 90-97% on a molar basis of ethyl acrylate and 3-10% on a molar basis of divinylbenzene said amine being present during the reaction in a ratio greater than one mole per mole of ethyl acrylate and divinylbenzene in said copolymer.

(iii) IRA-743. This is described in U.S. Pat. No. 2,813,838. Claim 5 of this patent reads as follows: A resinous product capable of removing boron compounds from solutions thereof which comprises an insoluble cross-linked copolymer of a mixture of 85% to 99.5%, on a molar basis, of styrene and 0.5% to 15%, on a molar basis, of divinylbenzene, said copolymer having attached to the aromatic nuclei thereof groups of the structure $-CH_2N(CH_3)-C_6H_8(OH)_5$ in which the $-C_6H_8(OH)_5$ portion is the sorbityl radical.

Of these three resins, IRA-46 is the preferred resin, mainly because it appears to have the best selectivity for germanium. According to claim 6 of U.S. Pat. No. 4,184,019 the preferred amount of epichlorohydrin used to prepare the resin is from about two-thirds to about one and one-half times the stoichiometric amount required based on the amount of triethylene-tetramine taken.

Satisfactory germanium sorption may be achieved with leach solutions having a pH as low as 0.3. The pH of the leach solutions is advantageously higher than 1, and preferably higher than 2. Leach solutions containing excessive acid levels may preferably be treated to reduce their acid content by carrying out the leach of zinc bearing material to near "neutral", as is often practised, or by adding zinc oxide to the leach solutions. The pH may also be adjusted by any one of several acid removal techniques such as ion exchange or by neutralization with a suitable base. In fact a high feed pH of up to 9 would be ideal for the ion exchange step, if it were not for the presence of metals in the feed solution which precipitate. These metals usually place an upper limit on the pH of about 2.5 to 4 in actual practice. The leach solutions should preferably be substantially free of Fe (III) because of its poisonous effect on ion exchange resins.

For a sulphate feed solution, the free amine/hydroxide form of the exchange resin is preferred, since the chloride form would lead to the introduction of chloride ions deleterious to any subsequent electrolysis. It is noted that the sulfate form requires high consumption of alkaline eluant. Standard techniques are available whereby the ion exchange resins may be changed to this form by the removal of an acidic anion.

The aqueous medium for the elution step is preferably an alkaline solution with a pH higher than 9. The preferred alkaline solution is a sodium hydroxide solution. The eluant preferably contains sodium hydroxide in a concentration in the range of about 0.25 to 6 moles/liter. The elution can be carried out in one or two steps. When done in two steps, the elution in the first step is done with sodium hydroxide solution having a concentration in the range of about 0.2 to 0.5 moles NaOH/L, followed in the second step with sodium hydroxide solution having a concentration in the range of about 1 to 6 moles NaOH/L. The aqueous medium for the elution can also be an acid solution such as diluted sulphuric acid having an $H_2SO_4$ concentration in the range of about 0.5 to 2 moles/L, or so-called "return acid". The latter is the solution remaining after electrowinning zinc from sulphate solution, containing sulphuric acid, zinc and maganese. Hydrochloric acid solutions can also be used for elution, but then it is necessary that provisions be made to minimize chloride ion input into a sulphate electrolyte feed.

The temperature during sorption is preferably ambient or lower, as low as 15° C., but the temperature can reach 60° C. without harmful effects. The temperature during elution is preferably ambient or higher, from 20° C. to 55° C. Elution with alkaline solution is most efficient at temperatures higher than 30° C.

Basically, the process according to this invention has two main steps which are the germanium sorption step and the germanium elution step. However, the process may include other steps as found desirable. These other steps may include a pH adjustment step, for example by addition of a suitable base or by other methods known to the technical specialist. Between the sorption and elution steps are also included various rinse or wash steps as will be indicated below. In addition, after the elution step, the eluate can be treated for the recovery of the germanium intermediate product.

The examples which follow are not intended to limit the scope of application of the process but to help explain the invention.

EXAMPLE 1

Germanium sorption using IRA-46

A 26 mm diameter column of IRA-46 was prepared. The chloride form as received was converted to the free amine/hydroxide form by passing 1% sodium hydroxide solution until no chloride ion was detected in the effluent solution. The resin bed was rinsed by passing water through it until the pH of the effluent was 9. The volume of the bed at this stage was 365 mL. A leach solution, at ambient temperature, containing 205 mg/L germanium, 140 g/L zinc, 4 g/L cadmium, 260 mg/L antimony, 105 mg/L arsenic, 300 mg/L total iron and 35 mg/L indium, at a pH of 1.5, was passed through the column at 25 mL/min. A change in the resin colour from an orange to a dark green colour was observed.

At a germanium loading in the resin phase of 1500 mg Ge per liter of bed, the germanium recovery was 90%; and at a breakpoint germanium concentration of 80% of that in the feed, the loading was 2500 mg/L bed. The pH of the effluent rose to 3.2. Negligible amounts of zinc, cadmium, antimony, arsenic, iron and indium were sorbed by the bed. These results show that germanium is selectively sorbed from the feed solution in preference to the other metals present, and that a high germanium loading could be achieved in the resin bed.

EXAMPLE 2

Germanium elution with acid solution from IRA-46

A resin bed of IRA-46, treated to contain 2.5 g Ge/L bed, was rinsed with water to displace entrained feed solution. The germanium sorbed was eluted by passing "return acid" contain-ing 50 g/L zinc, 2 g/L manganese and 160 g/L $H_2SO_4$. After the passage of 5 bedvolumes of this solution at ambient temperature, 85.5% of the sorbed germanium was eluted giving a peak germanium concentration of 970 mg/L in the eluate fractions collected. In order to maximize the germanium concentration in the eluate, the 5 bedvolumes of eluting solution were recycled to elute a resin bed containing 2400 mg Ge per liter bed. The passage of the recycled eluting solution removed 63.3% of the sorbed germanium with a peak concentration of 1400 mg/L in the eluate fractions. The recovery of a germanium product, such as a sulphide concentrate, from such eluate solutions is known to be practicable.

EXAMPLE 3

Germanium elution with sodium hydroxide solution from IRA-46

A resin bed of IRA-46, 26 mm diameter and 750 mm deep was treated to contain 3400 mg Ge per liter of bed by passing a feed solution at ambient temperature containing 210 mg/L Ge at pH 1.3. The sorbed germanium was eluted by passing 6 molar NaOH solution at 15 mL/min with the temperature of the bed maintained at 50° C. Complete Ge elution was achieved after passing 1.5 L of eluant and the maximum concentration of Ge in the eluate fractions collected was 2600 mg/L. This represented a significant improvement over elution with acid solution as shown in Example 3.

EXAMPLE 4

Recycle of eluant using IRA-46

A 26 mm diameter, 1500 mm deep bed of IRA-46 was put through several cycles of loading and elution using feed solutions containing 110–150 mg/L Ge, 130 g/L Zn, 130–195 mg/L Sb, 65–110 mg/L As, 40 mg/L In, 35 mg/L Cu, 3.7–6 mg/L Te, 1.7 mg/L Se (and also containing varying levels of Cd, Fe, F, Cl) at pH 2 to 2.3 and temperatures 20°–23° C. A loading rate of 1.5 bed volumes/hour was used. Elution was carried out by recycling the same initially 6 molar sodium hydroxide solution with make-up of 6 molar sodium hydroxide solution, and at 1.5 bedvolumes per hour. The bed was maintained at 50° C. during elution. The results obtained are summarized in the following table:

| Cycle No. | mg/L Ge in feed | Loading obtained, mg Ge per liter bed | Peak mg/L Ge in eluate fractions |
|---|---|---|---|
| 1 | 150 | 4300 | 4700 |
| 2 | 150 | 6850 | 9400 |
| 3 | 150 | 6900 | 13800 |

The amounts of zinc, antimony, arsenic, indium, copper, tellurium, selenium, cadmium, iron, fluorine and chlorine sorbed by the resin bed were negligible.

EXAMPLE 5

Warm feed with low germanium content using IRA-46

Typical leach solutions obtainable at a zinc electrowinning plant are usually not at ambient temperature and may contain lower levels of germanium than those in the preceding examples. A run was carried out using a 26 mm diameter bed of IRA-46, 1500 mm deep, and a feed solution containing 55 mg/L germanium, 127 g/L zinc, 83 mg/L antimony, 21 mg/L arsenic, 17 mg/L indium, 12 mg/L copper, 2 mg/L tellurium and having a pH of 2.2 and a temperature of 40° C. The feed rate to the column was maintained at 1.5 bedvolumes/hour with the bed maintained at 40° C. Loading results are summarized as below:
Volume of feed passed at germanium breakthrough—19 bedvolumes
Volume of feed passed at cut-off germanium concentration of 47 gm/L—80 bedvolumes
Loading at cut-off—3700 mg Ge/L bed
This result demonstrated that a satisfactory germanium loading could be achieved at higher than ambient temperature even with a lower than normal germanium concentration in the feed solution. The amounts of zinc, antimony, arsenic, indium, copper and tellurium sorbed by the resin bed were negligible.

EXAMPLE 6

Eluant consumption with IRA-46

A resin bed was loaded with germanium by passing a leach solution containing 150 mg/L Ge and typical levels of zinc, arsenic, antimony, etc. and at pH 2. After the usual rinse and backwash steps, the bed was then eluted with a sodium hydroxide solution containing 156 g of sulphate ion as sodium sulphate. The eluate containing 244 g of sulphate ion indicated that 88 g had been eluted from the resin bed, or that 89.8 g of sulphuric acid had been neutralized in the bed during elution. The amount of sodium hydroxide consumed in the neutralization is calculated to be 73.3 g. By chemical analysis of the eluant and eluate solutions it was determined that the total consumption of sodium hydroxide was 74 g. This result illustrates that consumption of the sodium hydroxide eluant is mostly due to neutralization of sorbed acid ($H_2SO_4$) to form sodium sulphate in the eluate. Thus the elution step may be considered as consisting of sulphuric acid neutralization as well as germanium desorption into solution. This may be accomplished by an elution scheme described under Example 7 below.

EXAMPLE 7

Two-part elution scheme using IRA-46

A 1.2 L IRA-46 resin bed was loaded to contain 4200 mg Ge per liter bed as in Example 1 and eluted by first passing 0.5 molar sodium hydroxide and then 3 molar sodium hydroxide solution as follows:

| Eluant | Volume passed | Rate | Temperature |
|---|---|---|---|
| 0.5 M NaOH | 1500 mL | 60 mL/min | 50° C. |
| 3 M NaOH | 5500 mL | 60 mL/min | 50° C. |

The bed was maintained at 50° C. during elution. The results obtained are as tabulated below.

| Cumulative Volume of Eluant passed mL | | Concentration in effluent (g/L) | |
|---|---|---|---|
| | | Ge | SO$_4$ |
| 0.5 M NaOH | 500 | 0.100 | 23.9 |
| | 1000 | 0.095 | 62.9 |
| | 1500 | 0.155 | 117.5 |
| 3 M NaOH | 1750 | 2.80 | 85.5 |
| | 2000 | 1.30 | 5.5 |
| | 2250 | 0.450 | 1.1 |
| | 2500 | 0.300 | 0.675 |
| | 3500 | 0.150 | 0.325 |
| | 4500 | 0.080 | 0.215 |
| | 5500 | 0.040 | 0.155 |
| | 6500 | 0.065 | 0.725 |
| | 7000 | 0.030 | 0.080 |

Thus, the eluate obtained by passing 0.5 molar NaOH may be rejected with little germanium loss while substantially reducing the amount of sodium sulphate in the eluate product.

EXAMPLE 8

Shake test using IRA-743

A 100 mL portion (wet) of Amberlite IRA-743 was contacted with 150 mL of aqueous solution with the partial assay: 110 mg/L germanium, 480 mg/L fluoride, 25 g/L sulphuric acid, 4.3 g/L iron.

Some precipitation was noticed. On separation of liquid and analysis of the liquid phase it was found to contain 25 mg/L germanium, 390 mg/L fluoride, 0.1 g/L sulphuric acid and 3.2 g/L iron. A 77% germanium removal and almost 100% acid removal from solution were obtained.

EXAMPLE 9

Sorption Column test using IRA-743

From Example 8, minimization of both acid and iron content of the feedstock appeared called for.

A 26 mm diameter, 750 mm deep bed of Amberlite IRA-743 was prepared. A feed solution containing 220 mg/L germanium, 5.5 g/L sulphuric acid (pH ~ 1.4), 55 mg/L chloride, 18.2 mg/L fluoride, 300 mg/L iron was passed through the column downflow at 1200 mL/h.

A germanium recovery of 94% was achieved at a cut-off loading of 830 mg Ge per liter of bed.

EXAMPLE 10

Sorption shake tests using IRA-68

A 100 mL (wet) portion of IRA-68 (in the free amine form) was contacted with fresh 200 mL portions of germanium feed solution containing 220 mg/L germanium, 135 g/L zinc, 5.5 g/L sulphuric acid (pH ~ 1.4), 195 mg/L antimony, 103 mg/L arsenic, 300 mg/L iron, 35 mg/L indium, 18.2 mg/L fluoride, 55 mg/L chloride, allowing for a 5–10 minute contact each time, and separating the resin from the solution after each contact. The contacts were carried out under ambient conditions. The results obtained are summarized in Table 1.

TABLE 1

| | Solution Analyses After Contact | | | |
|---|---|---|---|---|
| | Resin Portion A | | Resin Portion B | |
| Contact | pH | mg/L Ge | pH | mg/L Ge |
| 1 | 5.4 | <5 | 5.2 | 24 |
| 2 | 5.2 | 5 | 5.1 | 43 |
| 3 | 5.2 | 50 | 5.0 | 65 |
| 4 | — | — | 4.5 | 130 |

A contacting scheme to sorb greater than 90% of the germanium content of the feed solution is apparent to the technical specialist.

EXAMPLE 11

Sorption column tests using IRA-68

A 26 mm diameter column of IRA-68 was prepared. The settled volume of the resin bed was 500 mL.

A leach solution, containing 215 mg/L germanium, 140 g/L zinc, 175 mg/L antimony, 102 mg/L arsenic, 300 mg/L iron, 4.5 g/L cadmium, 40 mg/L indium, was passed through the column at 1200 mL/h.

At a cut-off germanium loading of 1100 mg/L bed, the germanium recovery was 85.6%; and at a break point germanium concentration of 86% of that in the feed, the loading was 1930 mg/L bed and the germanium recovery was 73.7%.

EXAMPLE 12

Germanium elution with acid solution using IRA-68

A resin bed treated to contain 1900 mg/L germanium was eluted by passing return acid containing 50 g/L zinc and 160 g/L sulphuric acid. The passage of 3 bed volumes of the eluant removed 77.7% of sorbed germanium giving a highest cut germanium concentration of 1100 mg/L.

The recycle of this eluate to maximize Ge concentration, and germanium product (e.g. the sulphide concentrate) recovery from the eluate is obvious to the expert in the field.

EXAMPLE 13

IRA-68 elution with sodium hydroxide solution

Two 100 mL portions of resin loaded to contain 1236 mg germanium per L resin were washed with 200 mL portions of water at room temperature. One portion was contacted for 10 minutes with 3–100 mL portions of 3 M sodium hydroxide at room temperature (20–25° C.), and the second portion was similarly treated but at 50° C.

The results obtained are summarized in Table 2 below:

TABLE 2

| | Analyses of Liquid Portions After Contact | | | |
|---|---|---|---|---|
| | Resin Portion A | | Resin Portion B | |
| | Temp. | pH | mg/L Ge | Temp. | pH | mg/L Ge |
| Water Wash | 23° C. | 5.8 | 10 | 23° C. | 5.6 | 12 |
| 1st Caustic Contact | 23° C. | 13.2 | 15 | 50° C. | 12.8 | 570 |
| 2nd Caustic Contact | 23° C. | 13.6 | 110 | 50° C. | 13.1 | 350 |
| 3rd Caustic Contact | 23° C. | 13.7 | 90 | 50° C. | 13.3 | 113 |
| % Ge Removed | | 18.2% | | | 84.5% | |

Thus, increased temperature greatly improves caustic elution.

In these Examples the resins IRA-46, IRA-68 and IRA-743 are used. These resins are characterized as follows by their maker, Rohm and Haas Company.

IRA-46—This resin is intended for treating sugar syrups, especially corn syrup. It is a gel-type weakly basic anion exchange resin in which the basic groups are amino groups. It is an epichlorohydrin condensate with a mixture of polyamines. The resulting resin has a mixture of about 20% quaternary ammonium groups, and 80% of secondary and tertiary amine groups. It is characterized as a weakly basic anion exchange resin.

IRA-68—This is a gel-type anion exchange resin having an acrylic gel-type polymeric matrix to which are attached mostly tertiary amine functional groups.

IRA-743—This is a weakly basic macroporous resin known to be highly specific for boron. It has a skeletal structure of polystyrene cross-linked with divinylbenzene. The weakly basic active groups, derived from N-methylglucamine, also known as methylsorbitylamine, consist mainly of secondary and tertiary amine groups.

Based on the above Examples, the following overall process cycle has been used which is familiar to those skilled in the art.
1. Contact the germanium-containing feed solution with ion exchange resin.
2. Separate treated solution from resin.
3. Separate any solids present in the feed solution and precipitated therefrom in the resin, from the resin.
4. Rinse the resin with water to remove residual metals in any entrained liquid.
5. Elute germanium.
6. Displace entrained eluant from the resin.
7. Rinse resin to remove any remaining eluant.
8. If necessary, convert resin to a different form for further use in step 1.

Some comments on these steps can be made. In step 1, when treating zinc electrowinning solutions, the amine or the hydroxide form of the resin is preferred. If sulphate or chloride elution is used in step 5, their conversion to the amine or the hydroxide form will be needed in step 8. In step 2, if a column is used the separation is conveniently obtained by using water or air. Similarly in step 3 for a column, a back wash would be advantageous. In step 5, any suitable temperature maintenance and control steps can also be taken.

It is understood that modifications can be made in the process according to the invention without departing from the scope and spirit of the appended claims.

What we claim as our invention is:

1. A process for the recovery of germanium from aqueous solutions containing germanium, zinc and antimony, which process comprises:
   (i) germanium sorption from the aqueous solution by contacting the solution with an ion exchange resin which has as its matrix a backbone polymer to which are attached amino active groups chosen from secondary and tertiary amines and quaternary ammonium groups, which resin also exhibits a selectivity ratio of germanium relative to antimony of at least 50:1; and
   (ii) elution of the sorbed germanium from the ion exchange resin with an aqueous medium to provide an aqueous solution containing the major part of the germanium sorbed by the resin, and a resin containing a minor part of the sorbed germanium.

2. A process according to claim 1 wherein the ion exchange resin comprises a weakly basic ion exchange resin comprising a polymer containing secondary hydroxyl groups, said polymer being a condensation product of epichlorohydrin, and triethylenetetramine, which polymer contains tertiary amine groups resulting from the reaction of the condensation product with formaldehyde and thereafter with formic acid.

3. A process according to claim 1 wherein the ion exchange resin comprises the product obtained by reacting at a temperature from 140° C. to 250° C. (a) dimethylaminopropylamine and (b) a cross-linked copolymer of 90–97% on a molar basis of ethyl acrylate and 3–10% on a molar basis of divinylbenzene said amine being present during the reaction in a ratio greater than one mole per mole of ethyl acrylate and divinylbenzene in said copolymer.

4. A process according to claim 1 wherein the ion exchange resin comprises an insoluble cross-linked copolymer of a mixture of 85% to 99.5%, on a molar basis, of styrene and 0.5% to 15%, on a molar basis, of divinylbenzene, said copolymer having attached to the aromatic nuclei thereof groups of the structure $-CH_2N(CH_3)C_6H_8(OH)_5$ in which the $-C_6H_8(OH)_5$ portion is the sorbityl radical.

5. A process according to claim 2 wherein the polymer is a condensation product of from about two-thirds of a stoichiometric amount of epichlorohydrin with triethylenetetramine to about one and one-half times the stoichiometric amount of epichlorohydrin with triethylenetetramine.

6. A process according to claim 1 wherein the ion exchange resin is known as IRA-46, IRA-68, or IRA-743.

7. A process according to claim 1 wherein the ion exchange resin is known as IRA-46.

8. A process according to claim 1 wherein the ion exchange resin is converted to the free amine or hydroxide form before the sorption step.

9. A process according to claim 1 wherein the pH of the aqueous solution is adjusted to be 0.3 or more alkaline before the sorption step.

10. A process according to claim 9 wherein the pH of the aqueous solution is in the range of about 0.3 to 4.0.

11. A process according to claim 9 wherein the pH of the aqueous solution is in the range of about 1.0 to 2.5.

12. A process according to claim 9 wherein the pH is adjusted by adding zinc oxide to the solution.

13. A process according to claim 1 wherein the sorption step is carried out at a temperature of from about 15° C. to about 60° C.

14. A process according to claim 1 in which the aqueous medium used as the eluant is an acid solution.

15. A process according to claim 1 in which the aqueous medium used as the eluant is a sulphuric acid solution.

16. A process according to claim 15 in which the sulphuric acid solution contains from about 0.5 moles $H_2SO_4$/liter to about 2 moles $H_2SO_4$/liter.

17. A process according to claim 14 in which the acid solution additionally contains zinc or manganese.

18. A process according to claim 1 in which the aqueous medium used as the eluant is an alkaline solution.

19. A process according to claim 18 in which the eluant is a sodium hydroxide solution.

20. A process according to claim 19 in which the sodium hydroxide concentration is in the range of about 0.20 moles NaOH/liter to about 6 moles NaOH/liter.

21. A process according to claim 20 in which the elution is carried out in two steps, the elution in the first step being done with sodium hydroxide solution having a concentration in the range of about 0.2 to 0.5 moles NaOH/liter, followed in the second step with sodium hydroxide solution having a concentration in the range of about 1 to 6 moles NaOH/liter.

22. A process according to claim 1 wherein the elution step is carried out at a temperature of from about 20° C. to about 55° C.

23. A process according to claim 20 wherein the elution step is carried out at a temperature above about 30° C.

24. A process according to claim 1 wherein the aqueous solution also contains at least one element chosen from cadmium, iron, arsenic, copper, tellurium, selenium, cobalt, nickel, thallium, indium, aluminum, gallium, tin, lead, manganese, calcium, magnesium, chlorine and fluorine.

25. A process according to claim 24 wherein any iron present is in the Fe(II) form.

* * * * *